(12) United States Patent
Wu et al.

(10) Patent No.: US 11,371,889 B2
(45) Date of Patent: Jun. 28, 2022

(54) FREEFORM SURFACE REFLECTIVE INFRARED IMAGING SYSTEM

(71) Applicants: Tsinghua University, Beijing (CN); HON HAI PRECISION INDUSTRY CO., LTD., New Taipei (TW)

(72) Inventors: Wei-Chen Wu, Beijing (CN); Jun Zhu, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

(*) Notice: Subject to any disclaimer, the term of this patent is extended or adjusted under 35 U.S.C. 154(b) by 190 days.

(21) Appl. No.: 16/916,016

(22) Filed: Jun. 29, 2020

(65) Prior Publication Data
US 2021/0033469 A1 Feb. 4, 2021

(30) Foreign Application Priority Data
Aug. 1, 2019 (CN) .......................... 201910709146.6

(51) Int. Cl.
| | | |
|---|---|---|
| *H04N 5/33* | (2006.01) | |
| *G01J 5/08* | (2022.01) | |
| *G01J 5/0806* | (2022.01) | |
| *G01J 5/00* | (2022.01) | |

(52) U.S. Cl.
CPC .......... *G01J 5/0846* (2013.01); *G01J 5/0806* (2013.01); *G01J 2005/0077* (2013.01)

(58) Field of Classification Search
CPC ............ G02B 17/0642; G02B 17/0626; G02B 13/22; G02B 17/00; G02B 17/02; G02B 27/0012; G02B 17/0636; G02B 27/0025; G02B 5/10; G02B 17/06; G02B 17/0663
USPC ......... 348/259, 333, 340, 335; 359/351, 355
See application file for complete search history.

(56) References Cited

U.S. PATENT DOCUMENTS

| | | | | |
|---|---|---|---|---|
| 6,016,220 | A * | 1/2000 | Cook | G02B 17/0642 359/861 |
| 8,279,404 | B2 * | 10/2012 | Chan | B82Y 10/00 355/71 |
| 9,268,122 | B2 * | 2/2016 | Zhu | G02B 17/0642 |
| 9,703,084 | B2 * | 7/2017 | Zhu | G02B 17/0642 |
| 9,846,298 | B2 * | 12/2017 | Zhu | G02B 17/0694 |
| 10,088,681 | B2 * | 10/2018 | Rolland | G02B 27/0176 |
| 10,197,799 | B2 * | 2/2019 | Hou | G02B 27/0012 |
| 2012/0038812 | A1 * | 2/2012 | Neil | G02B 17/0642 348/340 |
| 2014/0266986 | A1 | 9/2014 | Magyari | |
| 2016/0232258 | A1 | 8/2016 | Yang et al. | |

* cited by examiner

*Primary Examiner* — Masum Billah
(74) *Attorney, Agent, or Firm* — ScienBiziP, P.C.

(57) ABSTRACT

The present invention relates to a freeform surface reflective infrared imaging system comprising a primary mirror, a secondary mirror, a tertiary mirror, and an infrared light detector. Each reflective surface of the primary mirror, the secondary mirror, and the tertiary mirror is an xy polynomial freeform surface. A field of view of the freeform surface reflective infrared imaging system is larger than or equal to 40°×30°. An F-number of the freeform surface reflective infrared imaging system is less than or equal to 1.39.

16 Claims, 8 Drawing Sheets

FREEFORM SURFACE REFLECTIVE INFRARED IMAGING SYSTEM

CROSS-REFERENCE TO RELATED APPLICATIONS

This application claims all benefits accruing under 35 U.S.C. § 119 from China Patent Application No. 201910709146.6, filed on Aug. 1, 2019, in the China National Intellectual Property Administration, the contents of which are hereby incorporated by reference. This application is related to applications entitled, "METHOD FOR DESIGNING A FREEFORM SURFACE REFLECTIVE IMAGING SYSTEM", filed Jun. 24, 2020 Ser. No. 16/910,370.

FIELD

The present disclosure relates to a freeform surface reflective infrared imaging system with a low F-number and a wide field of view at the same time.

BACKGROUND

Off-axis three-mirrors optical imaging systems offer advantages such as high transmission, wide spectral ranges and no chromatic aberrations. Therefore the off-axis three-mirrors optical systems have numerous applications in the imaging field. To avoid beam obscuration, a rotational symmetry of the off-axis imaging system is usually broken, which results in some unconventional off-axis aberrations. Surfaces with rotational symmetry, like spherical and aspherical surfaces, have a week ability to correct these aberrations, particularly in high-performance off-axis systems. Optical freeform surfaces have multiple degrees-of-freedom without rotational symmetry. This feature makes freeform surfaces suitable for the correction of off-axis aberrations. In recent years, freeform optical surfaces have been used in various off-axis reflective imaging system and have demonstrated high levels of performance. As an important family of off-axis reflective imaging systems, systems that have both a low F-number and a wide rectangular field of view (FOV) simultaneously are rare, and the design of such systems is difficult and poses many challenges.

Infrared imaging systems with short focal lengths have important applications in vehicle obstacle avoidance and security monitoring. Compared with the visible band, the infrared imaging systems require a larger relative aperture when the camera operates in the infrared range. Additionally, to meet requirements of these applications, the systems also require a wide rectangular FOV to obtain a sufficiently large observation range.

What is needed, therefore, is to provide a freeform surface reflective infrared imaging system with a low F-number and a wide rectangular FOV at the same time.

BRIEF DESCRIPTION OF THE DRAWINGS

Many aspects of the exemplary embodiments can be better understood with reference to the following drawings. The components in the drawings are not necessarily drawn to scale, the emphasis instead being placed upon clearly illustrating the principles of the exemplary embodiments. Moreover, in the drawings, like reference numerals designate corresponding parts throughout the several views.

DETAILED DESCRIPTION

The disclosure is illustrated by way of embodiments and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set fourth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to illustrate details and features of the present disclosure better.

Several definitions that apply throughout this disclosure will now be presented.

The term "substantially" is defined to be essentially conforming to the particular dimension, shape, or other feature which is described, such that the component need not be exactly or strictly conforming to such a feature. The term "include," when utilized, means "include, but not necessarily limited to"; it specifically indicates open-ended inclusion or membership in the so-described combination, group, series, and the like.

Figure 1:
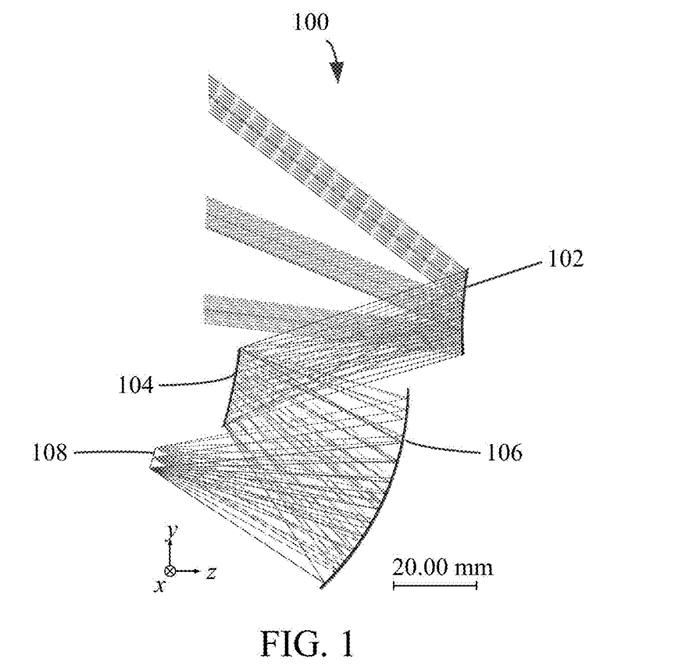
FIG. 1 shows a light path schematic view of an embodiment of a freeform surface reflective infrared imaging system.

Referring to FIG. 1, a freeform surface reflective infrared imaging system 100 is provided in one embodiment. The freeform surface imaging system 100 comprises a primary mirror 102, a secondary mirror 104, and a tertiary mirror 106 adjacent and spaced from each other. A surface shape of each of the primary mirror 102, the secondary mirror 104, and the tertiary mirror 106 is a freeform surface. The secondary mirror 104 is an aperture stop. The feature rays exiting from the light source would be successively reflected by the primary mirror 102, the secondary mirror 104, and the tertiary mirror 106 to form an image on an infrared light detector 108.

A first three-dimensional rectangular coordinates system (X,Y,Z) is defined by a location of the primary mirror 102; a second three-dimensional rectangular coordinates system (X',Y',Z') is defined by a location of the secondary mirror 104; and a third three-dimensional rectangular coordinates system (X'',Y'',Z'') is defined by a location of the tertiary mirror 106.

A vertex of the primary mirror 102 is an origin of the first three-dimensional rectangular coordinates system (X,Y,Z). A horizontal line passing through the vertex of the primary mirror 102 is defined as a Z-axis; in the Z-axis, to the left is negative, and to the right is positive. In a plane shown in FIG. 1, a Y-axis is substantially perpendicular to the Z-axis; in the Y-axis, to the upward is positive, and to the downward is negative. An X-axis is substantially perpendicular to a YZ plane; in the X-axis, to the inside is positive, and to the outside is negative.

A reflective surface of the primary mirror 102 in the first three-dimensional rectangular coordinates system (X,Y,Z) is xy polynomial freeform surface; and the xy polynomial equation can be expressed as follows:

$$z(x, y) = \frac{c(x^2 + y^2)}{1 + \sqrt{1 - (1+k)c^2(x^2 + y^2)}} + \sum_{i=1}^{N} A_i x^m y^n.$$

In the xy polynomial equation, z represents surface sag, c represents surface curvature, k represents conic constant, while $A_i$ represents the ith term coefficient. Since the freeform surface reflective infrared imaging system 100 is symmetrical about a YOZ plane, only even order terms of x can remain. At the same time, higher order terms will increase the fabrication difficulty of the off-axial three-mirror optical system with freeform surfaces. In one embodiment, the reflective surface of the primary mirror 102 is sixth-order polynomial freeform surface of xy without odd items of x; and an equation of the sixth-order polynomial freeform surface of xy can be expressed as follows:

$$z(x, y) = \frac{c(x^2 + y^2)}{1 + \sqrt{1 - (1+k)c^2(x^2 + y^2)}} + A_3 y + A_4 x^2 +$$
$$A_6 y^2 + A_8 x^2 y + A_{10} y^3 + A_{11} x^4 + A_{13} x^2 y^2 + A_{15} y^4 + A_{17} x^4 y +$$
$$A_{19} x^2 y^3 + A_{21} y^5 + A_{22} x^6 + A_{24} x^4 y^2 + A_{26} x^2 y^4 + A_{28} y^6.$$

In one embodiment, the values of c, k, and $A_i$ in the equation of the sixth-order polynomial freeform surface of xy of the reflective surface of the primary mirror 102 are listed in TABLE 1. However, the values of c, k, and $A_i$ in the sixth-order xy polynomial equation are not limited to TABLE 1.

TABLE 1

| | |
|---|---|
| c | −4.0303026823E−02 |
| k | −0.246608934 |
| $A_3$ | 1.102819918 |
| $A_4$ | 1.5055048746E−02 |
| $A_6$ | 3.0811550727E−03 |
| $A_8$ | −1.5584704535E−04 |
| $A_{10}$ | −8.0159103383E−05 |

TABLE 1-continued

| | |
|---|---|
| $A_{11}$ | 5.6769894586E−06 |
| $A_{13}$ | 1.6779417093E−05 |
| $A_{15}$ | 1.3326099114E−05 |
| $A_{17}$ | 6.6724563253E−09 |
| $A_{19}$ | 2.0942621230E−08 |
| $A_{21}$ | −10074885792E−07 |
| $A_{22}$ | 5.5987096160E−09 |
| $A_{24}$ | 1.4536947015E−08 |
| $A_{26}$ | −1.1198752821E−09 |
| $A_{28}$ | 1.66338.30552E−08 |

A vertex of the secondary mirror 104 is an origin of the second three-dimensional rectangular coordinates system (X',Y',Z'). The second three-dimensional rectangular coordinates system (X',Y',Z') is obtained by moving the first three-dimensional rectangular coordinates system (X,Y,Z) along a Z-axis negative direction and a Y-axis negative direction. In one embodiment, The second three-dimensional rectangular coordinates system (X',Y',Z') is obtained by moving the first three-dimensional rectangular coordinates system (X,Y,Z) for about 19.985 mm along a Y-axis negative direction, and then moving for about 54.736 mm along a Z-axis negative direction, and then rotating along the counterclockwise direction for about 102.365° with the X axis as the rotation axis. A distance between the origin of the first three-dimensional rectangular coordinates system (X,Y,Z) and the origin of the second three-dimensional rectangular coordinates system (X',Y',Z') is about 58.270 mm.

In the second three-dimensional rectangular coordinates system (X',Y',Z'), a reflective surface of the secondary mirror is x'y' polynomial freeform surface. The x'y' polynomial surface equation can be expressed as follows:

$$z'(x', y') = \frac{c'(x'^2 + y'^2)}{1 + \sqrt{1 - (1+k')c'^2(x'^2 + y'^2)}} + \sum_{i=1}^{N} A'_i x'^m y'^n,$$

In the x'y' polynomial freeform surface equation, z' represents surface sag, c' represents surface curvature, k' represents conic constant, while $A_i'$ represents the ith term coefficient. Since the freeform surface off-axis three-mirror imaging system 100 is symmetrical about Y'Z' plane, so even-order terms of x' can be only remained. At the same time, higher order terms will increase the fabrication difficulty of the freeform surface off-axial three-mirror imaging system 100. In one embodiment, the reflective surface of the secondary mirror is fourth-order polynomial freeform surface of x'y' without odd items of x'. An equation of the eighth-order polynomial freeform surface of x'y' can be expressed as follows:

$$z'(x', y') = \frac{c'(x'^2 + y'^2)}{1 + \sqrt{1 - (1+k')c'^2(x'^2 + y'^2)}} + A'_3 y' + A'_4 x'^2 +$$
$$A'_6 y'^2 + A'_8 x'^2 y' + A'_{10} y'^3 + A'_{11} x'^4 + A'_{13} x'^2 y'^2 + A'_{15} y'^4.$$

In one embodiment, the values of c', k', and $A_i'$ in the equation of the fourth-order polynomial freeform surface of x'y' are listed in TABLE 2. However, the values of c', k', and $A_i'$ in the equation of the fourth-order polynomial freeform surface of x'y' are not limited to TABLE 2.

TABLE 2

| | |
|---|---|
| c' | −4.122602429E−03 |
| k' | −1416846018 |
| $A_3'$ | 1.040243304 |
| $A_4'$ | −1.097441026E−02 |
| $A_6'$ | −1.011174721E−02 |
| $A_8'$ | −2.717007666E−04 |
| $A_{10}'$ | −3.124098593E−04 |
| $A_{11}'$ | −6.210601971E−06 |
| $A_{13}'$ | −1.492063200E−05 |
| $A_{15}'$ | −9.235891809E−06 |

A vertex of the tertiary mirror 106 is an origin of the third three-dimensional rectangular coordinates system (X",Y",Z"). The third three-dimensional rectangular coordinates system (X",Y",Z") is obtained by moving the second three-dimensional rectangular coordinates system (X',Y',Z') along a Z'-axis positive direction and a Y'-axis negative direction. In one embodiment, the third three-dimensional rectangular coordinates system (X",Y",Z") is obtained by moving the second three-dimensional rectangular coordinates system (X',Y',Z') for about 27.254 mm along a Z'-axis positive direction, and then moving for about 9.489 mm along a Y'-axis negative direction, and then rotating along the clockwise direction for about 99.526° with the X'-axis as the rotation axis. A distance between the origin of the third three-dimensional rectangular coordinates system (X",Y",Z") and the origin of the second three-dimensional rectangular coordinates system (X',Y',Z') is about 28.859 mm.

In the third three-dimensional rectangular coordinates system (X",Y",Z"), a reflective surface of the tertiary mirror 106 is x"y" polynomial freeform surface. The x"y" polynomial surface equation can be expressed as follows:

$$z''(x'', y'') = \frac{c''(x''^2 + y''^2)}{1 + \sqrt{1 - (1 + k'')c''^2(x''^2 + y''^2)}} + \sum_{i=1}^{N} A_i'' x''^m y''^n.$$

In the x"y" polynomial freeform surface equation, z" represents surface sag, c" represents surface curvature, k" represents conic constant, while $A_i''$ represents the ith term coefficient. Since the freeform surface off-axial three-mirror imaging system 100 is symmetrical about Y"Z" plane, so even-order terms of x" can be only remained. At the same time, higher order terms will increase the fabrication difficulty of the freeform surface off-axial three-mirror imaging system 100. In one embodiment, the reflective surface of the tertiary mirror 106 is an sixth-order polynomial freeform surface of x"y" without odd items of x". An equation of the sixth-order polynomial freeform surface of x"y" can be expressed as follows:

$$z''(x'', y'') = \frac{c''(x''^2 + y''^2)}{1 + \sqrt{1 - (1 + k'')c''^2(x''^2 + y''^2)}} + A_3'' y'' + A_4'' x''^2 + A_6'' y''^2 + A_8'' x''^2 y'' + A_{10}'' y''^3 + A_{11}'' x''^4 + A_{13}'' x''^2 y''^2 + A_{15}'' y''^4 + A_{17}'' x''^4 y'' + A_{19}'' x''^2 y''^3 + A_{21}'' y''^5 + A_{22}'' x''^6 + A_{24}'' x''^4 y''^2 + A_{26}'' x''^2 y''^4 + A_{28}'' y''^6.$$

In one embodiment, the values of c", k", and $A_i''$ in the sixth order x"y" polynomial surface equation are listed in TABLE 3. However, the values of c", k", and $A_i''$ in the sixth order x"y" polynomial surface equation are not limited to TABLE 3.

TABLE 3

| | |
|---|---|
| c" | 1.73550214E−02 |
| k" | 6.04800191E−02 |
| $A_3''$ | −1.40844984E−01 |
| $A_4''$ | −4.55580022E−04 |
| $A_6''$ | −1.14279113E−03 |
| $A_8''$ | −1.26674093E−05 |
| $A_{10}''$ | −1.22701520E−05 |
| $A_{11}''$ | −6.55735767E−08 |
| $A_{13}''$ | −2.32802996E−07 |
| $A_{15}''$ | −1.64314821E−07 |
| $A_{17}''$ | −2.32144674E−09 |
| $A_{19}''$ | −3.96831849E−09 |
| $A_{21}''$ | −1.87466581E−09 |
| $A_{22}''$ | −1.51821809E−11 |
| $A_{24}''$ | −3.36887948E−11 |
| $A_{26}''$ | −3.61503376E−11 |
| $A_{28}''$ | −1.82307088E−11 |

Materials of the primary mirror 102, the secondary mirror 104, and the tertiary mirrors 106 are not limited, as long as they have high reflectivity. The materials of the primary mirror 102, the secondary mirror 104 and the tertiary mirror 106 can be aluminum, beryllium or other metals. The materials of the primary mirror 102, the secondary mirror 104 and the tertiary mirror 106 can also be silicon carbide, quartz or other inorganic materials. A reflection enhancing coating can also be coated on the metals or inorganic materials to enhance the reflectivity performance of the three mirrors. In one embodiment, the reflection enhancing coating is a gold film. A size of each of the primary mirror 102, the secondary mirror 104 and the tertiary mirror 106 can be designed according to actual needs.

In the third three-dimensional rectangular coordinates system (X",Y",Z"), a distance along the Z"-axis negative direction between a center of the infrared light detector 108 and the vertex of the tertiary mirror 106 is about 45.926 mm. The center of the infrared light detector 108 deviates from the Z" axis in the positive direction of the Y" axis, and a deviation is about 7.518 mm. An angle of the infrared light detector 108 with the X"Y" plane in the counterclockwise direction is about 16°. A size of the infrared light detector 108 can be selected according to actual needs. In one embodiment, the size of the infrared light detector 108 is 6.8 mm×5.1 mm.

The FOV of the freeform surface reflective infrared imaging system 100 is larger than or equal to 40°×30°. In one embodiment, the FOV of the freeform surface reflective infrared imaging system 100 is 40°×30°.

A working wavelength range of the tree-form reflective infrared imaging system 100 is from about 8000 nm to about 12000 nm. The working wavelength of the free-form reflective infrared imaging system 100 is not limited to this embodiment, and can be adjusted according to actual needs.

An effective focal length (EFL) of the freeform surface reflective infrared imaging system 100 is about 150 mm.

The F-number of the freeform surface reflective infrared imaging system 100 is less than or equal to 1.39. A relative aperture (D/f) is the reciprocal of the F-number. In one embodiment, the F-number is 1.39, and the relative aperture (D/f) is 0.719.

Figure 2:
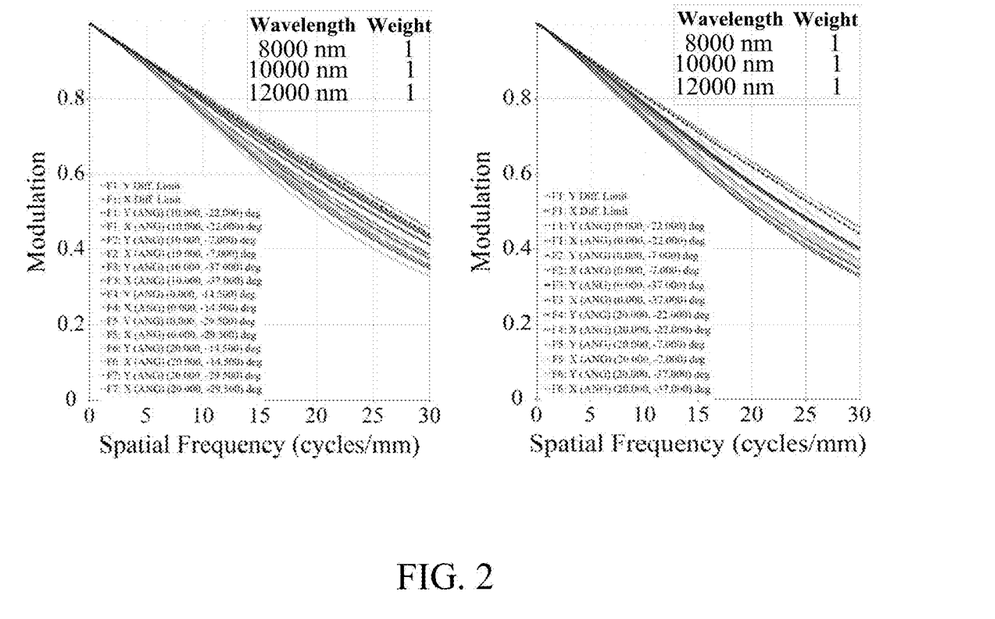
FIG. 2 shows modulation transfer functions (MTF) of the freeform surface reflective infrared imaging system in FIG. 1.

Referring to FIG. 2, a modulation transfer functions (MTF) of the freeform surface reflective infrared imaging system 100 in the infrared band of partial field angles are close to the diffraction limit. It shows that an imaging quality of the freeform surface reflective infrared imaging system 100 is high.

Figure 3:
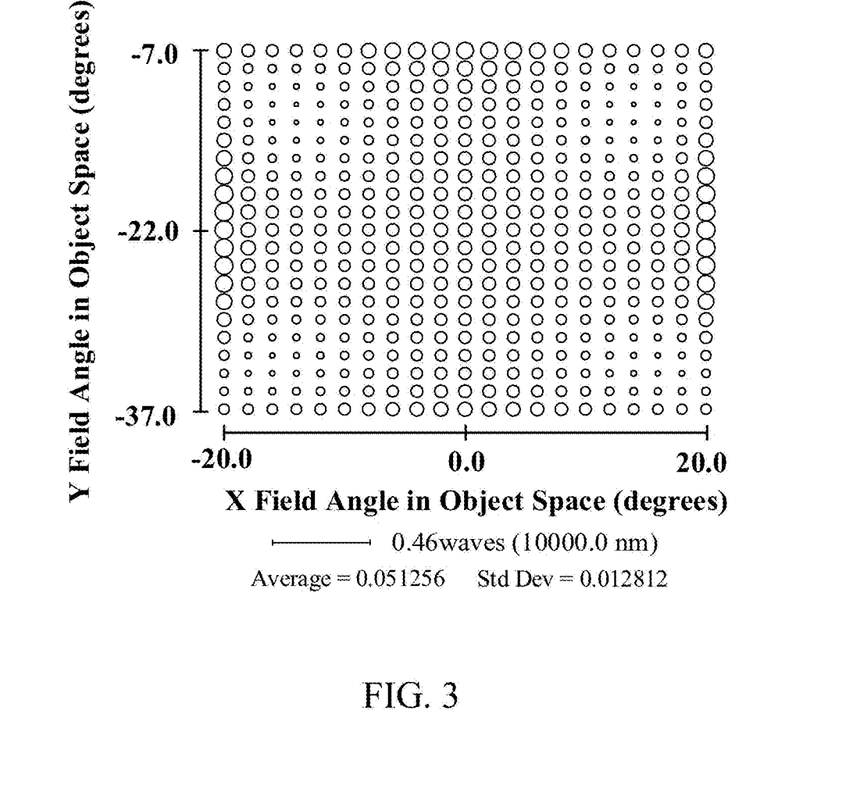
FIG. 3 shows an average wave aberration of the freeform surface reflective infrared imaging system in FIG. 1.

Referring to FIG. 3, an average wave aberration of the freeform surface reflective infrared imaging system 100 is 0.051λ, λ=10000.0 nm. It shows that an imaging quality of the freeform surface reflective infrared imaging system 100 is high.

Figure 4:
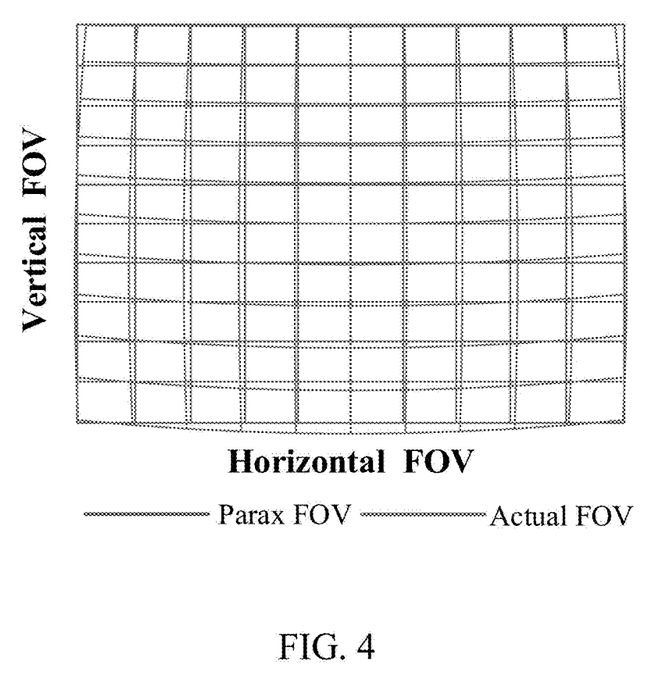
FIG. 4 shows a relative distortion diagram of the freeform surface reflective infrared imaging system in FIG. 1.

Referring to FIG. 4, it can be seen that a maximum relative distortion of the freeform surface reflective infrared imaging system 100 is 5.5%. The freeform surface reflective infrared imaging system 100 has small relative distortion compared with other freeform off-axis three-mirror imaging systems with larger field angles. It shows that an imaging error is small and the image quality is high.

Figure 5:
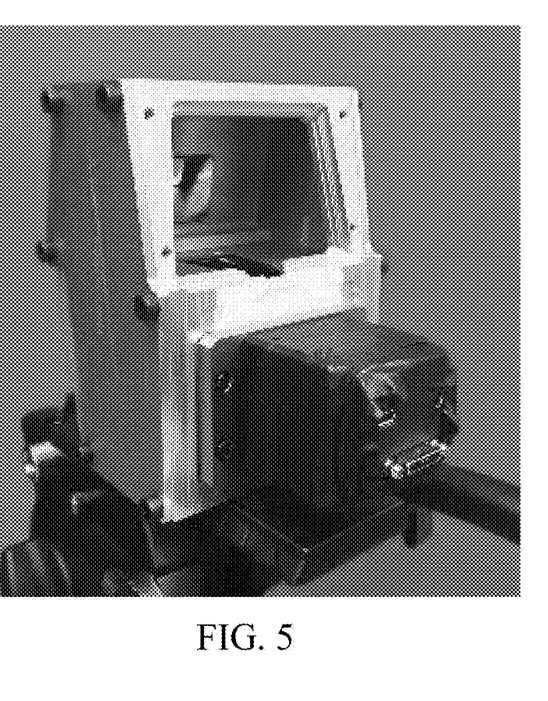
FIG. 5 shows a photograph of a processing prototype of the freeform surface reflective infrared imaging system in FIG. 1.
Figure 6:
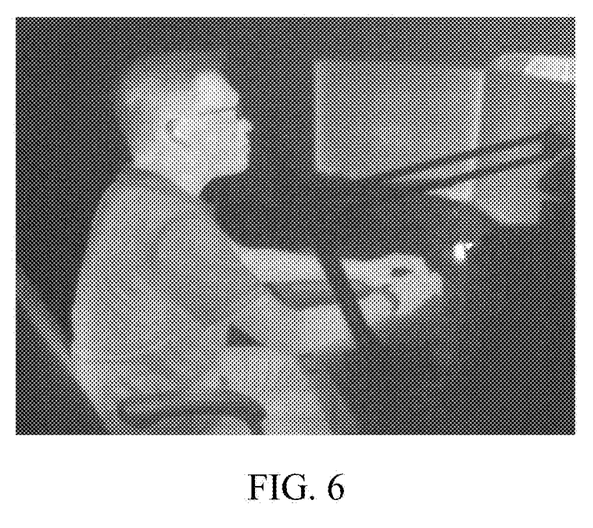
FIG. 6 shows an indoor imaging result of the freeform surface reflective infrared imaging system in FIG. 1 with an imaging distance of 5 meters.
Figure 7:
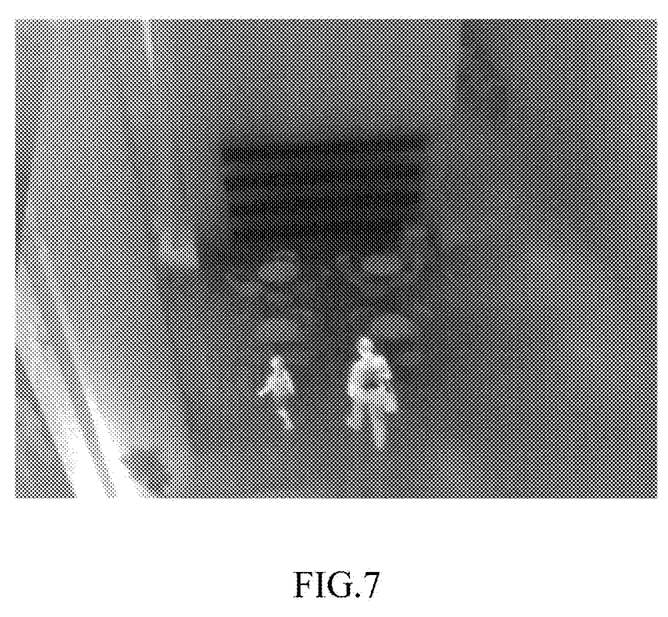
FIG. 7 shows an indoor imaging result of the freeform surface reflective infrared imaging system in FIG. 1 with an imaging distance of 20 meters.
Figure 8:
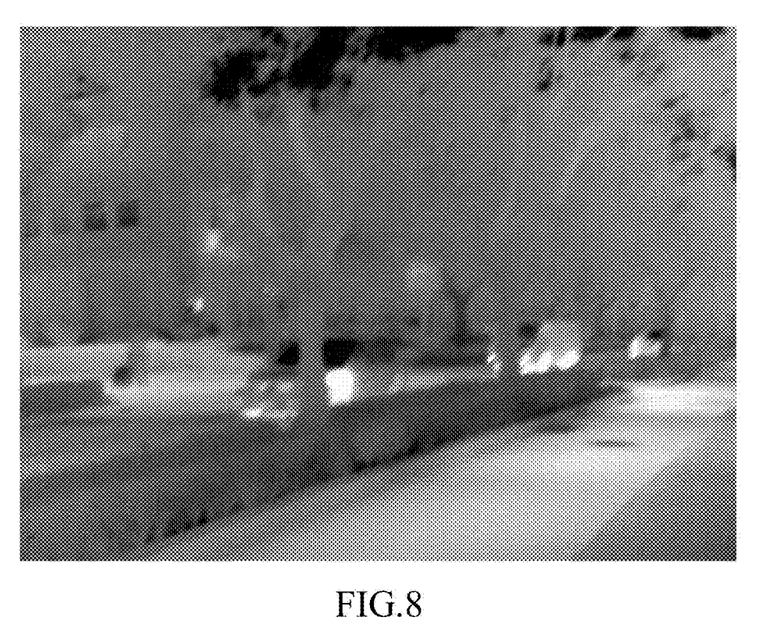
FIG. 8 shows an imaging result of outdoor road condition information of the freeform surface reflective infrared imaging system in FIG. 1.

Referring to FIG. 5, an infrared camera is prepared by using the freeform surface reflective infrared imaging system 100. A size of the camera is 80×80×60 mm³. The size of the camera is small, and it is convenient to carry. Referring to FIG. 6, FIG. 7 and FIG. 8, the imaging of the freeform surface reflective infrared imaging system 100 is clear and the imaging performance is good. Thus this system can be applied to vehicle-mounted obstacle avoidance systems and monitoring and security systems.

The freeform surface reflective infrared imaging system 100 adopts an off-axis three-mirrors system without central obstruction. The imaging system 100 has a large rectangular FOV of 40°×30°, resulting in a large imaging range. The F-number of the imaging system 100 is less than 1.39, and high-resolution images can be obtained. The freeform surface reflective infrared imaging system 100 has a small volume of 80×80×60 mm³, and is easy to carry.

The freeform surface reflective infrared imaging system 100 can be applied to ground observation, space target detection, astronomical observation, multi-spectral thermal imaging, and stereo mapping. The freeform surface reflective infrared imaging system 100 reaches the diffraction limit in the infrared band and can be used in both the visible band and the infrared band.

The embodiments shown and described above are only examples. Even though numerous characteristics and advantages of the present technology have been set fourth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A freeform surface reflective infrared imaging system, comprising:
    a primary mirror, wherein a first three-dimensional rectangular coordinates system (X,Y,Z) is defined with a vertex of the primary mirror as a first origin, and in the first three-dimensional rectangular coordinates system (X,Y,Z), a reflective surface of the primary mirror is an xy polynomial freeform surface;
    a secondary mirror, wherein a second three-dimensional rectangular coordinates system (X',Y',Z') is defined with a vertex of the secondary mirror as a second origin, and the second three-dimensional rectangular coordinates system (X',Y',Z') is obtained by moving the first three-dimensional rectangular coordinates system (X,Y,Z) along a Z-axis negative direction and a Y-axis negative direction, and in the second three-dimensional rectangular coordinates system (X',Y',Z'), a reflective surface of the secondary mirror is an x'y' polynomial freeform surface;
    a tertiary mirror, wherein a third three-dimensional rectangular coordinates system (X",Y",Z") is defined with a vertex of the tertiary mirror as a third origin, and the third three-dimensional rectangular coordinates system (X",Y",Z") is obtained by moving the second three-dimensional rectangular coordinates system (X',Y',Z') along a Z'-axis positive direction and a Y'-axis negative direction, and in the third three-dimensional rectangular coordinates system (X",Y",Z"), a reflective surface of the tertiary mirror is an x"y" polynomial freeform surface;
    an infrared light detector, wherein a plurality of feature rays are successively reflected by the primary mirror, the secondary mirror and the tertiary mirror to form an image on an infrared light detector;
    a field of view of the freeform surface reflective infrared imaging system is larger than or equal to 40°×30°, and an F-number of the freeform surface reflective infrared imaging system is less than or equal to 1.39.

2. The system of claim 1, wherein the second three-dimensional rectangular coordinates system (X',Y',Z') is obtained by moving the first three-dimensional rectangular coordinates system (X,Y,Z) for about 19.985 mm along a Y-axis negative direction, and then moving for about 54.736 mm along a Z-axis negative direction, and then rotating along the counterclockwise direction for about 102.365° with the X axis as the rotation axis.

3. The system of claim 1, wherein the third three-dimensional rectangular coordinates system (X",Y",Z") is obtained by moving the second three-dimensional rectangular coordinates system (X',Y',Z') for about 27.254 mm along a Z'-axis positive direction, and then moving for about 9.489 mm along a Y'-axis negative direction, and then rotating along the clockwise direction for about 99.526° with the X'-axis as the rotation axis.

4. The system of claim 1, wherein the reflective surface of the primary mirror is sixth-order polynomial freeform surface of xy without odd items of x.

5. The system of claim 4, wherein an equation of the sixth-order polynomial freeform surface of xy can be expressed as follows:

$$z(x,y) = \frac{c(x^2+y^2)}{1+\sqrt{1-(1+k)c^2(x^2+y^2)}} + A_3 y + A_4 x^2 + A_6 y^2 + A_8 x^2 y + A_{10} y^3 + A_{11} x^4 + A_{13} x^2 y^2 + A_{15} y^4 + A_{17} x^4 y + A_{19} x^2 y^3 + A_{21} y^5 + A_{22} x^6 + A_{24} x^4 y^2 + A_{26} x^2 y^4 + A_{28} y^6,$$

wherein z represents surface sag, c represents surface curvature, k represents conic constant, and $A_i$ represents the ith term coefficient.

6. The system of claim 5, wherein c=−4.0303026823E−02, k=−0.246608934, $A_3$=1.102819918, $A_4$=1.5055048746E−02, $A_6$=3.0811550727E−03, $A_8$=−1.5584704535E−04, $A_{10}$=−8.0159103383E−05, $A_{11}$=5.6769894586E−06, $A_{13}$=1.6779417093E−05, $A_{15}$=1.3326099114E−05, $A_{17}$=6.6724563253E−09, $A_{19}$=2.0942621230E−08, $A_{21}$=−3.0074885792E−07, $A_{22}$=5.5987096160E−09, $A_{24}$=1.4536947015E−08, $A_{26}$=−1.1198752821E−09, $A_{28}$=1.6633830552E−08.

7. The system of claim 1, wherein reflective surface of the secondary mirror is fourth-order polynomial freeform surface of x'y' without odd items of x'.

8. The system of claim 7, wherein an equation of the fourth-order polynomial freeform surface of x'y' can be expressed as follows:

$$z'(x', y') = \frac{c'(x'^2 + y'^2)}{1 + \sqrt{1 - (1 + k')c'^2(x'^2 + y'^2)}} + A'_3 y' + A'_4 x^2 +$$
$$A'_6 y'^2 + A'_8 x'^2 y' + A'_{10} y'^3 + A'_{11} x'^4 + A'_{13} x'^2 y'^2 + A'_{15} y'^4,$$

wherein z' represents surface sag, c' represents surface curvature, k' represents conic constant, and $A_i'$ represents the ith term coefficient.

9. The system of claim 8, wherein c'=−4.122602429E−03, k'=−3.416846018, $A_3'$=1.040243304, $A_4'$=1.040243304, $A_6'$=−1.011174721E−02, $A_8'$=−2.717007666E−04, $A_{10}'$=−3.124098593E−04, $A_{11}'$=−6.210601971E−06, $A_{13}'$=−1.492063200E−05, $A_{15}'$=−9.235891809E−06.

10. The system of claim 1, wherein the reflective surface of the tertiary mirror is sixth-order polynomial freeform surface of x"y" without odd items of x".

11. The system of claim 10, wherein an equation of the sixth-order polynomial freeform surface of x"y" can be expressed as follows:

$$z''(x'', y'') = \frac{c''(x''^2 + y''^2)}{1 + \sqrt{1 - (1 + k'')c''^2(x''^2 + y''^2)}} + A''_3 y'' + A''_4 x''^2 + A''_6 y''^2 +$$

-continued $$A''_8 x''^2 y'' + A''_{10} y''^3 + A''_{11} x''^4 + A''_{13} x''^2 y''^2 + A''_{15} y''^4 + A''_{17} x''^4 y'' +$$
$$A''_{19} x''^2 y''^3 + A''_{21} y''^5 + A''_{22} x''^6 + A''_{24} x''^4 y''^2 + A''_{26} x''^2 y''^4 + A''_{28} y''^6$$

wherein z" represents surface sag, c" represents surface curvature, k" represents conic constant, and $A_i"$ represents the ith term coefficient.

12. The system of claim 11, wherein c"=1.73550214E−02, K"=6.04800191E−02, $A_3$"=−1.40844984E−01, $A_4$"=−4.55580022E−04, $A_6$"=−1.14279113E−03, $A_8$"=−1.26674093E−05, $A_{10}$"=−1.22701520E−05, $A_{11}$"=−6.55735767E−08, $A_{13}$"=−2.32802996E−07, $A_{15}$"=−1.64314821E−07, $A_{17}$"=−2.32144674E−09, $A_{19}$"=−3.96831849E−09, $A_{21}$"=−1.87466581E−09, $A_{22}$"=−1.51821809E−11, $A_{24}$"=−3.36887948E−11, $A_{26}$"=−3.61503376E−11, $A_{28}$"=−1.82307088E−11.

13. The system of claim 1, wherein in the third three-dimensional rectangular coordinates system (X",Y",Z"), a distance along the Z"-axis negative direction between a center of the infrared light detector and the vertex of the tertiary mirror s about 45.926 mm.

14. The system of claim 1, wherein in the third three-dimensional rectangular coordinates system (X",Y",Z"), the center of the infrared light detector deviates from the Z" axis in the positive direction of the Y" axis, and a deviation is about 7.518 mm.

15. The system of claim 1, wherein in the third three-dimensional rectangular coordinates system (X",Y",Z"), an angle of the infrared light detector 108 with the X"Y" plane in the counterclockwise direction is about 16°.

16. The system of claim 1, wherein a working wavelength range of the free-form reflective infrared imaging system is from about 8000 nm to about 12000 nm.

* * * * *